(12) United States Patent
Coon

(10) Patent No.: US 7,427,143 B1
(45) Date of Patent: Sep. 23, 2008

(54) INSTRUMENT CLUSTER WITH THREE-DIMENSIONAL DISPLAY

(75) Inventor: Zachary A Coon, Walled Lake, MI (US)

(73) Assignee: Yazaki North America, Inc., Canton, MI (US)

( * ) Notice: Subject to any disclaimer, the term of this patent is extended or adjusted under 35 U.S.C. 154(b) by 69 days.

(21) Appl. No.: 11/171,703

(22) Filed: Jun. 30, 2005

(51) Int. Cl.
*G01D 13/00* (2006.01)
*G01D 11/28* (2006.01)
*B60Q 1/00* (2006.01)

(52) U.S. Cl. .......................... 362/29; 362/489; 116/286
(58) Field of Classification Search .................. 362/23, 362/26–30, 84, 125, 154, 362, 367, 462, 362/463, 600, 489, 632, 471, 482; 116/48, 116/49, 54, 250, 286, 62.1, 62.2–62.4, 284–305; 73/499; 340/907
See application file for complete search history.

(56) References Cited

U.S. PATENT DOCUMENTS

| | | | |
|---|---|---|---|
| 2,009,209 A * | 7/1935 | Scantlebury | 362/26 |
| 2,108,342 A | 2/1938 | Fevre | |
| 2,496,488 A | 2/1950 | Ohman | |
| 3,150,634 A | 9/1964 | Rosen | |
| 3,389,678 A | 6/1968 | Fenwick | |
| 3,490,226 A | 1/1970 | Anderson et al. | |
| 3,621,811 A | 11/1971 | Hill, Jr. | |
| 3,803,831 A | 4/1974 | Horzick | |
| 4,409,827 A | 10/1983 | Overs | |
| 4,630,895 A | 12/1986 | Abdala, Jr. et al. | |
| 4,875,433 A | 10/1989 | Tsukamoto | |
| 4,911,096 A | 3/1990 | Munakata | |
| 5,079,470 A | 1/1992 | Kasuga et al. | |
| 5,201,277 A | 4/1993 | Aoki et al. | |
| 5,245,944 A * | 9/1993 | Yamamoto | 116/334 |
| 5,257,167 A | 10/1993 | Clem | |
| 5,997,161 A * | 12/1999 | Stringfellow et al. | 362/489 |
| 6,016,038 A | 1/2000 | Mueller et al. | |
| 6,088,300 A | 7/2000 | Nakajima et al. | |
| 6,150,774 A | 11/2000 | Mueller et al. | |
| 6,166,496 A | 12/2000 | Lys et al. | |

(Continued)

FOREIGN PATENT DOCUMENTS

EP 0 475 281 A2 3/1992

(Continued)

OTHER PUBLICATIONS

Stitch, Andreas. "LEDs, New Light Sources for Display Backlighting," Feb. 2, 2004, pp. 1-9.

*Primary Examiner*—Hargobind S. Sawhney
*Assistant Examiner*—David R Crowe
(74) *Attorney, Agent, or Firm*—Harness, Dickey & Pierce, P.L.C.

(57) ABSTRACT

A vehicle display having a housing, a pointer that is rotatably coupled to the housing, a first appliqué that is coupled to the housing, a second appliqué coupled to the housing, a first graphics set coupled to a surface of the first appliqué and a second graphics set coupled to a surface of the second appliqué. The second is spaced apart rearwardly from the first appliqué. The first and second graphics sets cooperate to at least partially form a display design that is adapted to be viewed from a front side of the vehicle display.

19 Claims, 4 Drawing Sheets

U.S. PATENT DOCUMENTS

| | | |
|---|---|---|
| 6,211,626 B1 | 4/2001 | Lys et al. |
| 6,302,522 B1 | 10/2001 | Rumph et al. |
| 6,340,868 B1 | 1/2002 | Lys et al. |
| 6,408,783 B1 | 6/2002 | Ludweig |
| 6,433,701 B1 * | 8/2002 | Simon et al. ............. 340/815.4 |
| 6,484,663 B2 | 11/2002 | Zech et al. |
| 6,520,654 B2 | 2/2003 | Angell et al. |
| 6,663,252 B1 * | 12/2003 | Fong et al. .................... 362/29 |
| 6,717,376 B2 | 4/2004 | Lys et al. |
| 6,754,139 B2 | 6/2004 | Herbstman et al. |
| 6,853,162 B2 | 2/2005 | Betts et al. |
| 6,864,930 B2 | 3/2005 | Matsushita et al. |
| 6,904,866 B2 * | 6/2005 | Furuya ....................... 116/286 |
| 7,066,630 B1 | 6/2006 | Venkatram |
| 7,233,310 B2 | 6/2007 | Lazaridis et al. |
| 7,275,497 B2 * | 10/2007 | Kato .......................... 116/304 |
| 2003/0207088 A1 * | 11/2003 | Inoue et al. .............. 428/195.1 |
| 2004/0085746 A1 | 5/2004 | Chen |
| 2004/0201793 A1 | 10/2004 | Anandan et al. |
| 2005/0063194 A1 | 3/2005 | Lys et al. |
| 2005/0078485 A1 * | 4/2005 | Kraus et al. ................. 362/489 |
| 2006/0012971 A1 | 1/2006 | Fong et al. |

FOREIGN PATENT DOCUMENTS

| | | |
|---|---|---|
| EP | 0 562 332 | 3/1993 |
| JP | 01260391 A | 10/1989 |
| JP | 02174570 A | 7/1990 |
| JP | 03200072 A | 9/1991 |
| JP | 06230158 A | 8/1994 |
| JP | 06230159 A | 8/1994 |

* cited by examiner

INSTRUMENT CLUSTER WITH THREE-DIMENSIONAL DISPLAY

INTRODUCTION

The present invention generally relates to indicator assemblies and more particularly to an indicator assembly with graphics having a three-dimensional appearance.

Indicator assemblies typically employ an appliqué to provide graphics such as a scale and/or tell-tale indicators. It is common for the graphics to be applied to one or both sides of the appliqué. As the appliqué is relatively thin, however, such two-sided appliqués do not provide a satisfactory three-dimensional appearance.

SUMMARY

In one form, the present teachings provide a vehicle display having a housing, a pointer that is rotatably coupled to the housing, a first appliqué that is coupled to the housing, a second appliqué coupled to the housing, a first graphics set coupled to a surface of the first appliqué and a second graphics set coupled to a surface of the second appliqué. The second is spaced apart rearwardly from the first appliqué. The first and second graphics sets cooperate to at least partially form a display design that is adapted to be viewed from a front side of the vehicle display.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

Additional advantages and features of the present invention will become apparent from the subsequent description and the appended claims, taken in conjunction with the accompanying drawings, wherein:

DETAILED DESCRIPTION OF THE VARIOUS EMBODIMENTS

Figure 1:
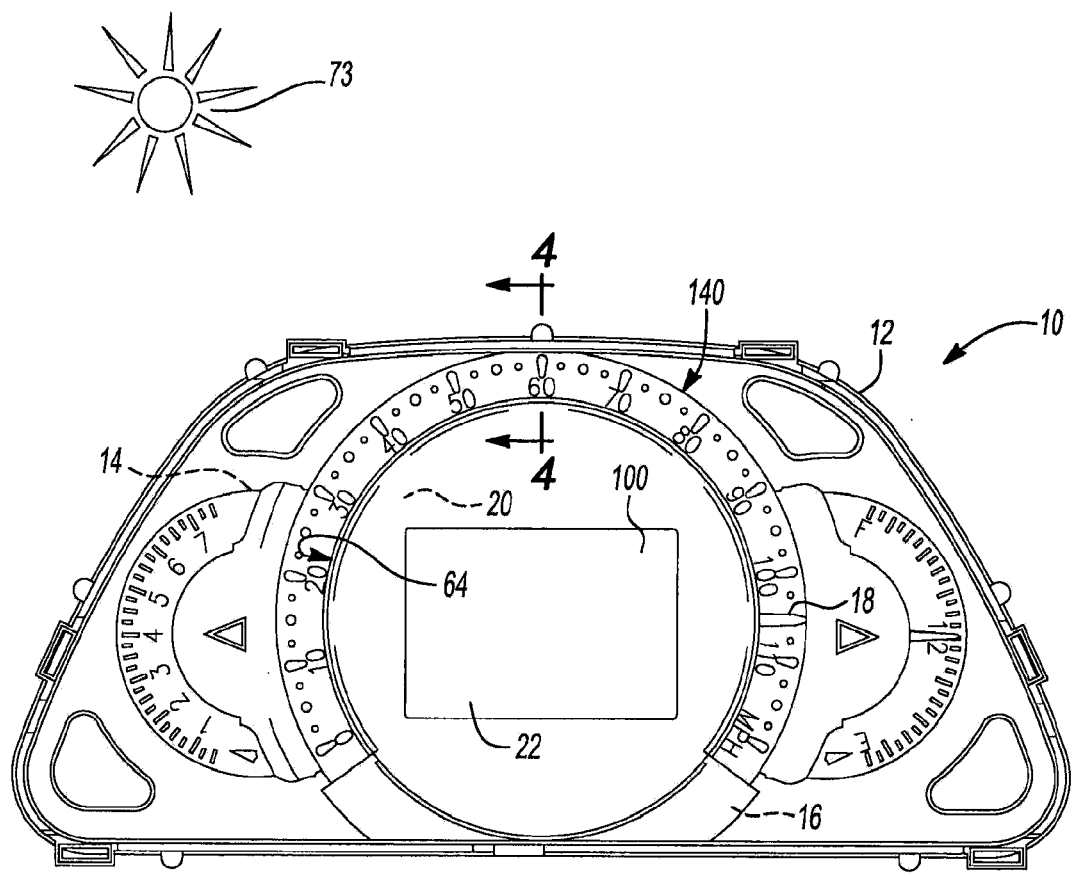
FIG. 1 is a front plan view of a vehicle gage constructed in accordance with the teachings of the present invention.
Figure 2:
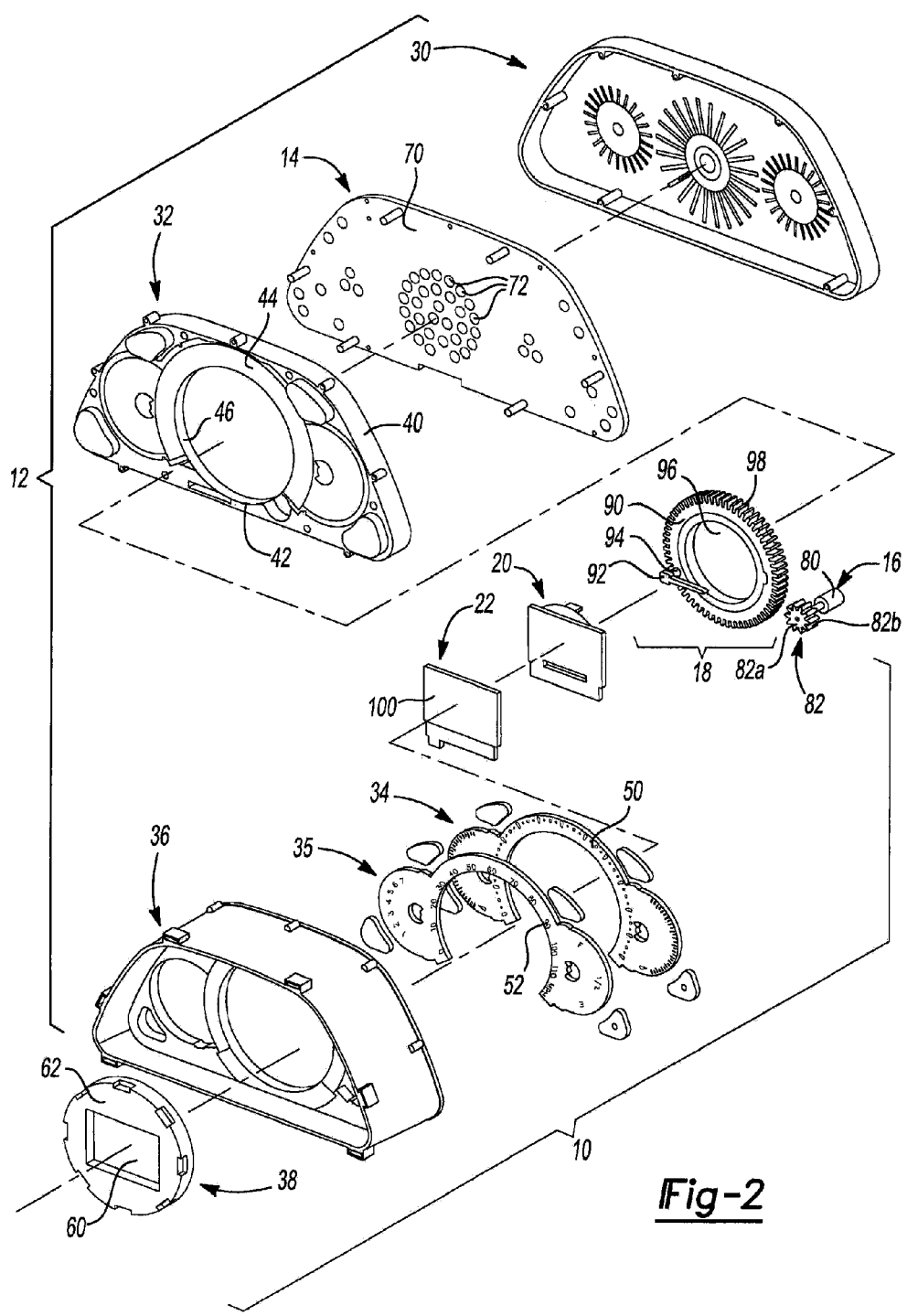
FIG. 2 is an exploded perspective view of the analog vehicle gage of FIG. 1.

With reference to FIGS. 1 and 2 of the drawings, an exemplary vehicle gage constructed in accordance with the teachings of the present invention is generally indicated by reference numeral 10. Except as provided below, the vehicle gage 10 in the example provided can be constructed in the manner described in co-pending and commonly assigned U.S. patent application Ser. No. 11/157,013 entitled "Vehicle Gage With Embedded Driver Information" filed Jun. 20, 2005, which is hereby incorporated by reference as if fully set forth herein.

The gage 10 can include a housing 12, a circuit board assembly 14, a motor assembly 16, a pointer 18, a light guide 20 and a display 22.

The housing 12 can include a rear housing 30, a reflector housing 32, a first appliqué 34, a second appliqué 35 a front mask 36 and a bezel 38. The rear housing 30 can cooperate with the reflector housing 32 to define a cavity in which the circuit board assembly 14 may be housed. The first appliqué 34 can be immovably coupled to the housing 12. The second appliqué 35 can also be immovably coupled to the housing 12. Relative movement can be prevented between the second appliqué 35 and the first appliqué 34, as each can be immovably coupled to the housing 12.

The reflector housing 32 can have housing body 40, which can include a sleeve 42 and a reflector member 44 that can extend about a portion of the sleeve 42. The sleeve 42 can be tubular structure that extends forwardly from an adjacent portion of the housing body 40. A plurality of windows 46 can be formed through the sleeve 42 to interconnect the space that is bounded by the reflector member 44 with the interior of the sleeve 42. The reflector housing 32 can be formed of an opaque and reflective material, such as a white colored plastic.

The first appliqué 34 can be configured to overlie the reflector housing 32 and can include a first graphics set 50 that will be discussed in further detail below. The second appliqué 35 can be configured to cover all or a portion of the first appliqué 34 and can include a second graphics set 52 that will also be discussed in further detail below.

The front mask 36 can be configured to be coupled to the reflector housing 32 and can fixedly secure the appliqué 34 in place between reflector housing 32 and the front mask 36. The front mask 36 can be formed of an opaque material.

The front cover or bezel 38 can include a transparent display aperture 60 and an opaque bezel background 62 that can be disposed about the transparent display aperture 60. The bezel 38 can be coupled to the front mask 36 in a manner that spaces bezel background 62 axially apart from the sleeve 42 of the reflector housing 32 such that a light transmitting aperture 64 is defined therebetween.

The circuit board assembly 14 can include a board member 70, which can abut the rearward side of the sleeve 42, and a light source, such as a backlighting light source 72. The light source can include a plurality of selectively illuminated light emitting diodes that can be mounded on the board member 70. The board member 70 can be configured such that the backlighting light source 72 is disposed within the sleeve 42 and positioned so that a portion of the light that is produced may be transmitted through the windows 46.

The motor assembly 16 can include a motor 80, which can be a stepper motor, a DC motor with a position sensor (e.g., an absolute position sensor) or an ultrasonic motor, and an optional output member 82 that can be driven by the motor 80. In the example provided, the output member 82 is a pinion 82a having a plurality of pinion teeth 82b, but in the alternative, the output member 82 could be a sprocket or a pulley of the type that is used with a toothed belt (e.g., timing belt).

The pointer 18 can have an annular pointer body 90, a pointer member 92 and a pointer light guide 94. The pointer body 90 can define a pointer aperture 96 and a plurality of teeth 98 can be formed about at least a portion a perimeter of pointer body 90. The pointer body 90 can be supported for rotation on the sleeve 42 and the teeth 98 can be meshingly engaged to the pinion teeth 82b of the pinion 82a. Accordingly, the motor assembly 16 can be employed to rotate the pointer body 90 about the sleeve 42. The pointer member 92 can be coupled to the pointer body 90 and can extend forwardly and outwardly therefrom so as to be positioned proximate the dial face indicia 50 on the appliqué 34. The pointer light guide 94 can be coupled to the pointer body 90 and can extend through the light transmitting aperture 64 into the interior of the sleeve 42. Accordingly, a portion of the light generated by the backlighting light source 72 can be gathered by the pointer light guide 94, directed through the pointer body 90 and into the pointer member 92 so that the pointer member 92 may be illuminated without incorporating a light source into the pointer member 92.

The light guide 20 can be coupled to the housing 12 and can be located within the interior of the sleeve 42. The light guide 20 can be formed of a light-conducting material, such as clear plastic, and can abut the display 22 so that light can be transmitted to through the light guide 20 to the display 22.

In the particular example provided, the display 22 is a liquid crystal display (LCD). The display 22 can be coupled to the light guide 20 and can have a display surface 100, which can be generally aligned to both the display aperture 60 in the bezel 38 and the pointer light guide 94. Accordingly, a portion of the light produced by the backlighting light source 72 can be employed to back-light the display 22. One of ordinary skill in the art will appreciate that the display 22 need not be an LCD but could alternatively be another type of display that may or may not require back-lighting. Examples of displays not requiring back-lighting include organic light emitting diode (OLED) displays, polymer light emitting diode displays, and thin film electroluminescent displays.

Figure 3:
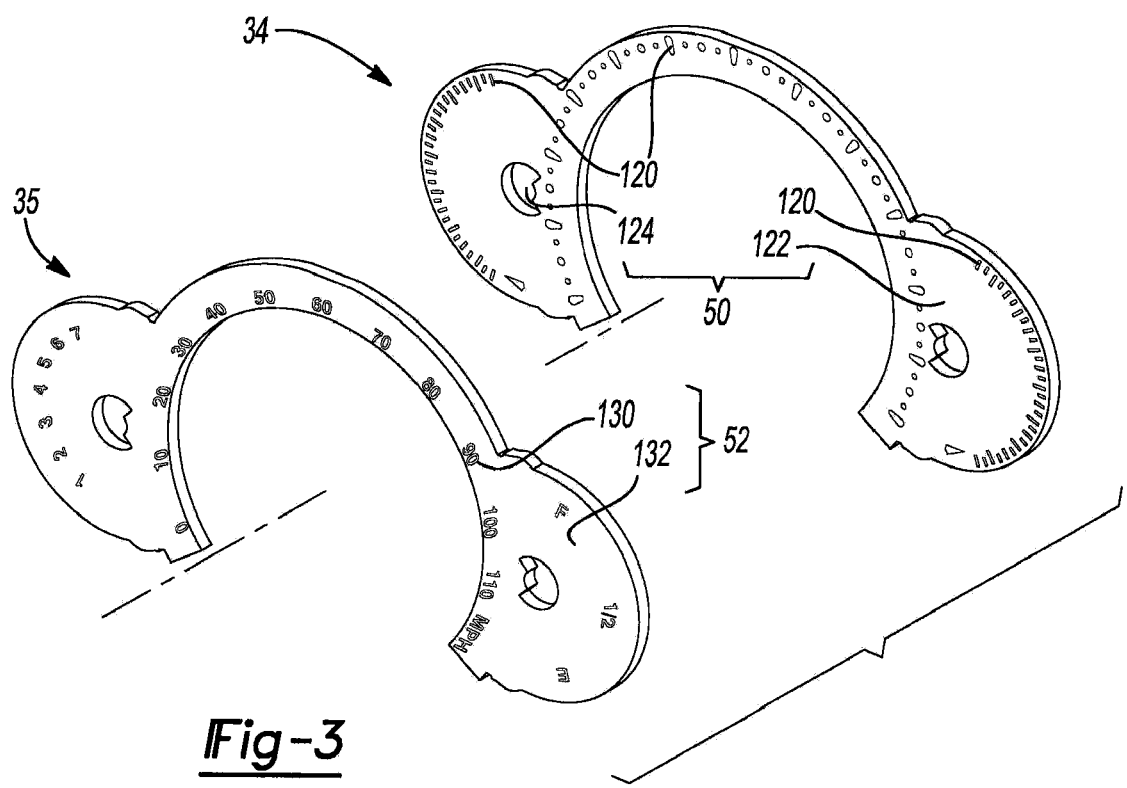
FIG. 3 is an enlarged view of a portion of FIG. 2 illustrating the first and second appliqués in greater detail.

With reference to FIG. 3, the first graphics set 50 can include a plurality of dial face indicia 120 that are configured to be disposed over the reflector member 44 (FIG. 2) and which surround a portion of the perimeter of the sleeve 42 (FIG. 2). The dial face indicia 120 can be translucent and can be surrounded by a transparent background 122. The dial face indicia 120 can further include one or more optional opaque masking elements 124 that may be employed at various locations to inhibit the transmission of light through the first appliqué 34 in an undesired manner.

The second graphics set 52 can include a plurality of dial face indicia 130 that are configured to be disposed in-line with portions of the first graphics set 50. In the particular example provided, the dial face indicia 130 can be translucent and can be surrounded by a background 132 that can be opaque in places (e.g., 132*a* shown in FIG. 4) and/or transparent and/or translucent in other places (e.g., 132*b* shown in FIG. 4).

Figure 4:
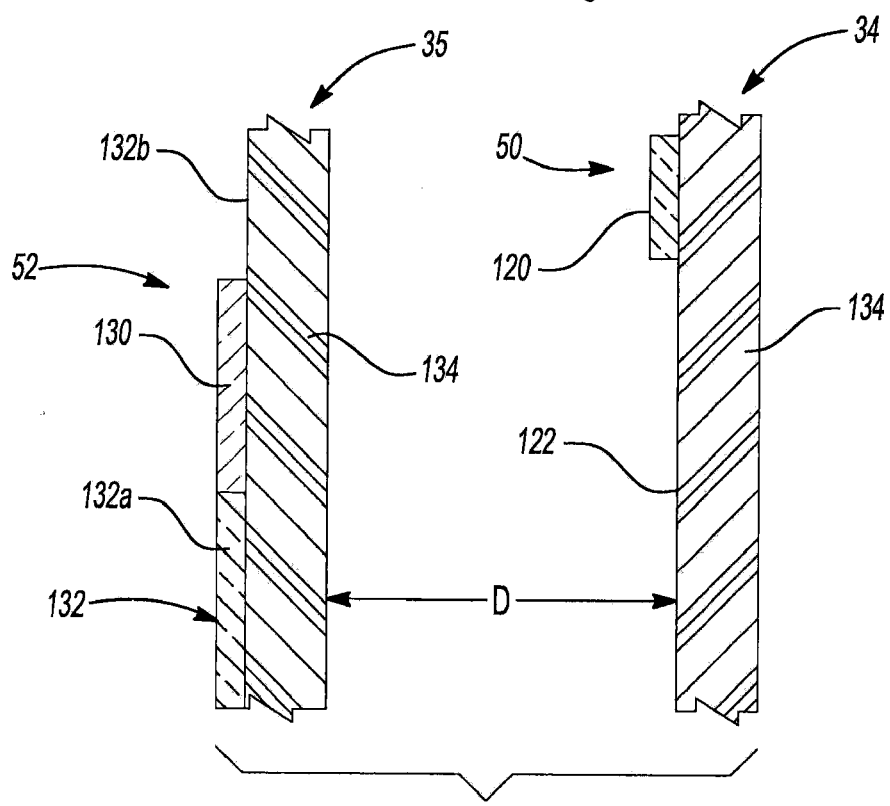
FIG. 4 is a sectional view of a portion of the vehicle gage of FIG. 1 illustrating the construction and arrangement of the first and second appliqués.

With reference to FIG. 4, the first and second appliqués 34 and 35 can include a transparent substrate 134 that can be formed of a clear polycarbonate. The first and second appliqués 34 and 35 can be spaced apart by a predetermined distance (D), such as a dimension that is greater than or equal to about 2 mm (0.079 inch), and more preferably a dimension that is greater than or equal to about 4 mm (0.157 inch). In the particular example provided, the first and second appliqués 34 and 35 are spaced apart by a suitable air gap, but it will be appreciated that the first and second appliqués 34 and 35 may abut the opposite surfaces of a spacing structure (not shown), such as a piece of polycarbonate plastic.

Figure 5:
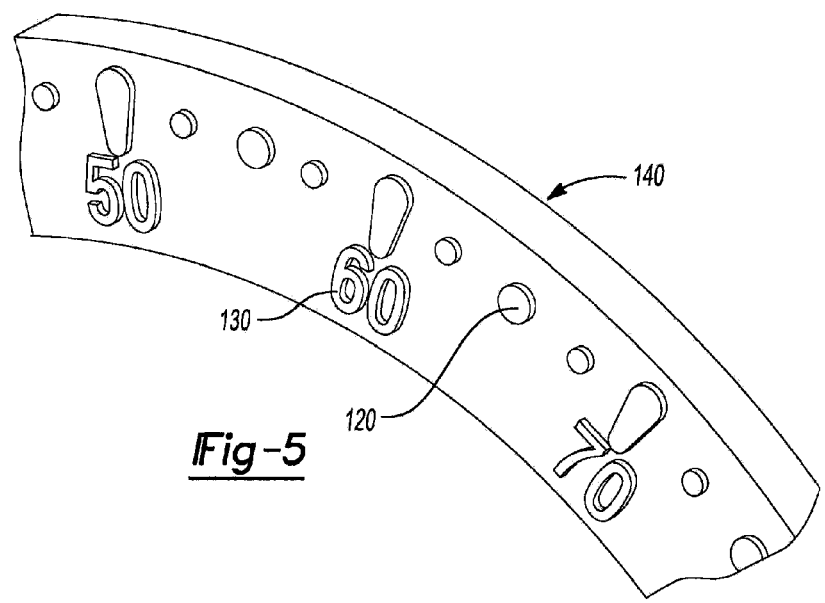
FIG. 5 is a front view of a portion of the vehicle gage of FIG. 1 illustrating the display design.

Returning to FIGS. 1 and 2, during operation of the vehicle gage 10, light produced by the backlighting light source 72 can be employed to illuminate the first and second graphics sets 50 and 52 and the pointer member 92 and to back-light the display surface 100 of the display 22. Since the first and second appliqués 34 and 35 are spaced apart from one another by a relatively significant distance, a person situated in front of the vehicle gage 10 would see the first and second graphics sets 50 and 52 as cooperating to form a display design 140 (partially illustrated in FIG. 5) having a depth of field that provides a three-dimensional display effect.

In view of the above-disclosure, those of ordinary skill in the art will appreciate that the invention, in its broadest aspects, may be configured somewhat differently. For example, the first and second graphics sets 50 and 52 need not be configured so as to be backlit, but rather could be configured so as to be visible only through direct lighting. In that case, a second or direct lighting light source 73 can be employed in addition to or in lieu of the light source 72 for illuminating the first and second graphics sets 50 and 52. In such case, the board member 70 and reflector housing 32 can be configured such that the second light source 73 is positioned to produce light that is directed toward the front side of the first and second appliqués 34 and 35. Light that reflects off the front side of the first and second appliqués 34 and 35 may be viewed by a person situated in front of the vehicle gage 10. Also in such case, the background 120 of the first appliqué 34 can be opaque, and the dial face indicia 120 and 130 of the first and second appliqués 34 and 35 can be opaque.

Figure 6:
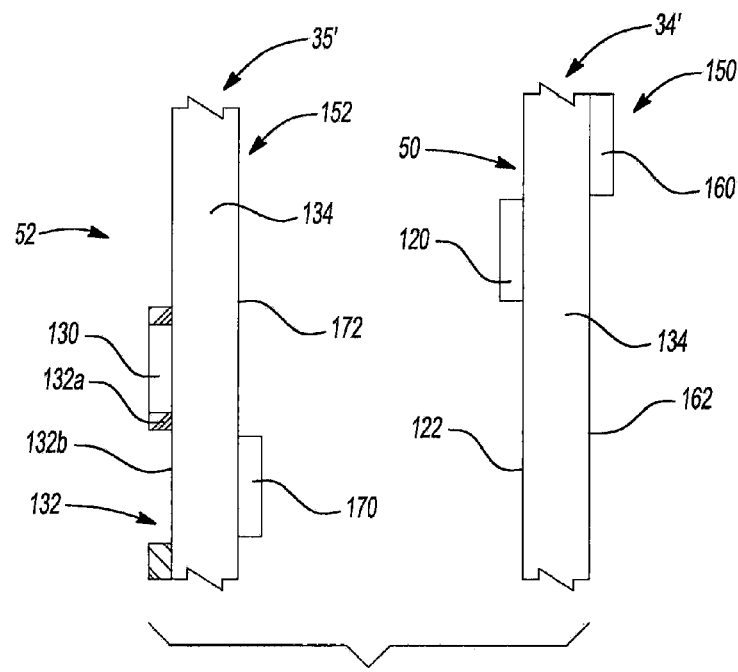
FIG. 6 is a view similar to that of FIG. 4 but illustrating alternately constructed first and second appliqués.

Those of ordinary skill in the art will also appreciate from this disclosure that the spaced-apart condition of the first and second appliqués 34 and 35 presents an opportunity to employ more than two discrete sets of graphics. With reference to FIG. 6, alternately constructed first and second appliqués 34' and 35' are illustrated. In this example, the first and second appliqués 34' and 35' are generally identical to the first and second appliqués 34 and 35 of FIG. 3, except that a set of graphics 150 and 152 has been applied to each of the first and second appliqués 34' and 35'.

More specifically, the first appliqué 34' can include the first graphics set 50 on a first side and a third set of graphics 150 on a second side. The third set of graphics can include a plurality of translucent dial face indicia 160 and can be surrounded by a clear background 162. Similarly, the second appliqué 35 can include the second graphics set 52 on a first side and a fourth set of graphics 152 on a second side. The fourth set of graphics can include a plurality of translucent dial face indicia 170 and can be surrounded by a clear background 172. The graphics sets 50, 52, 150 and 152 cooperate to form a display design having a depth of field that provides a three-dimensional display effect.

While the invention has been described in the specification and illustrated in the drawings with reference to various embodiments, it will be understood by those of ordinary skill in the art that various changes may be made and equivalents may be substituted for elements thereof without departing from the scope of the invention as defined in the claims. Furthermore, the mixing and matching of features, elements and/or functions between various embodiments is expressly contemplated herein so that one of ordinary skill in the art would appreciate from this disclosure that features, elements and/or functions of one embodiment may be incorporated into another embodiment as appropriate, unless described otherwise, above. Moreover, many modifications may be made to adapt a particular situation or material to the teachings of the invention without departing from the essential scope thereof. Therefore, it is intended that the invention not be limited to the particular embodiment illustrated by the drawings and described in the specification as the best mode presently contemplated for carrying out this invention, but that the invention will include any embodiments falling within the foregoing description and the appended claims.

What is claimed is:

1. A vehicle display comprising;
   a housing;
   a first appliqué immovably coupled to the housing;

a second appliqué immovably coupled to the housing so as to prevent relative movement of the second appliqué with respect to the first appliqué, the second appliqué being spaced apart rearwardly from the first appliqué;

a first graphics set coupled to a surface of the first appliqué;

a second graphics set coupled to a surface of the second appliqué;

a third graphics set coupled to a surface of the first appliqué opposite the first graphics set, the third graphics set also cooperating with the first and second graphics sets to at least partially form the display design; and a pointer rotatably coupled to the housing, wherein the first and second graphics sets cooperate to at least partially form a display design that is adapted to be viewed from a front side of the vehicle display and wherein the pointer is movable to indicate a value associated with the display design.

2. The vehicle display of claim 1, wherein the first and second graphics sets are spaced apart by a dimension that is greater than or equal to about 2 mm.

3. The vehicle display of claim 2, wherein the dimension is greater than or equal to about 4 mm.

4. The vehicle display of claim 2, further comprising a light source coupled to the housing, the light source being selectively operable for illuminating at least one of the first and second graphic sets.

5. The vehicle display of claim 4, wherein the light source is selectively operable for back-illuminating at least one of the first and second graphics sets.

6. The vehicle display of claim 1, wherein the first and second appliqués are separated by an air gap.

7. The vehicle display of claim 1, further comprising a fourth graphics set coupled to a surface of the second appliqué opposite the second graphics set, the fourth graphics set also cooperating with the first, second and third graphics sets to at least partially form the display design.

8. The vehicle display of claim 7, further comprising a light source coupled to the housing, the light source being selectively operable for illuminating at least one of the first, second and third graphics sets.

9. The vehicle display of claim 8, wherein the light source is selectively operable for back-illuminating at least one of the first, second and third graphics sets.

10. The vehicle display of claim 1, further comprising a light source coupled to the housing, the light source being selectively operable for illuminating at least one of the first, second and third graphics sets.

11. The vehicle display of claim 10, wherein the light source is selectively operable for back-illuminating at least one of the first, second and third graphics sets.

12. The vehicle display of claim 1, further comprising a light source that is employed to back-light at least one of the pointer, the first graphics set and the second graphics set.

13. The vehicle display of claim 1, further comprising a light source, the light source illuminating at least a portion of a front side of each of the first and second appliqués.

14. The vehicle display of claim 1, further comprising an additional graphics set coupled to at least one of a surface of the first appliqué opposite the first graphic set and a surface of the second appliqué opposite said second graphics set.

15. A vehicle display comprising:

a housing;

a pointer rotatably coupled to the housing;

a first appliqué coupled to the housing;

a second appliqué coupled to the housing, the second appliqué being spaced apart rearwardly from the first appliqué;

a first graphics set coupled to a surface of the first appliqué;

a second graphics set coupled to a surface of the second appliqué;

a third graphics set coupled to a surface of the first appliqué opposite the first graphics set, wherein the first, the second and the third graphics sets cooperate to at least partially form a display design that is adapted to be viewed from a front side of the vehicle display, and wherein the first and second graphics sets are spaced apart by a dimension that is greater than or equal to about 2 mm.

16. The vehicle display of claim 15, further comprising a fourth graphics set coupled to a surface of the second appliqué opposite the second graphics set, the fourth graphics set also cooperating with the first, second and third graphics sets to at least partially form the display design.

17. The vehicle display of claim 15, further comprising a light source coupled to the housing, the light source being selectively operable for illuminating at least one of the first, second and third graphics sets, wherein the light source is selectively operable for back-illuminating at least one of the first, second and third graphics sets.

18. A vehicle display comprising:

a housing;

a pointer rotatably coupled to the housing;

a first appliqué coupled to the housing;

a second appliqué coupled to the housing, the second appliqué being spaced apart rearwardly from the first appliqué;

a first graphics set coupled to a surface of the first appliqué;

a second graphics set coupled to a surface of the second appliqué;

a third graphics set coupled to a surface of the second appliqué opposite the second graphics set, wherein the first, the second and the third graphics sets cooperate to at least partially form a display design that is adapted to be viewed from a front side of the vehicle display, and wherein the first and second graphics sets are spaced apart by a dimension that is greater than or equal to about 2 mm.

19. The vehicle display of claim 18, further comprising a light source coupled to the housing, the light source being selectively operable for illuminating at least one of the first, second and third graphics sets, wherein the light source is selectively operable for back-illuminating at least one of the first, second and third graphics sets.

* * * * *